Jan. 22, 1952 R. E. UTTER 2,583,348
REMOTE CONTROL PARKING WINDSHIELD WIPER MOTOR
Filed Nov. 13, 1944 2 SHEETS—SHEET 1
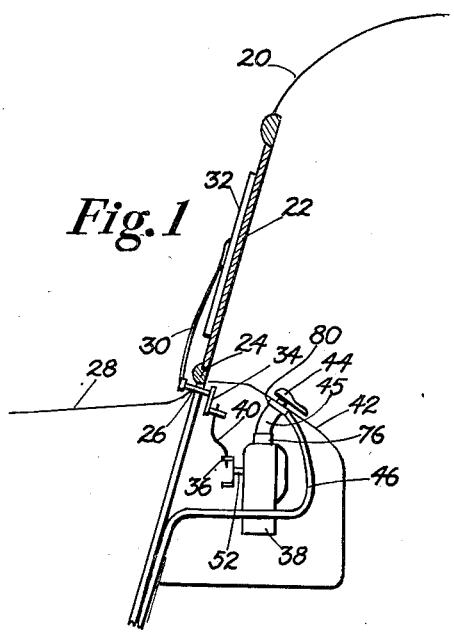
Fig. 1
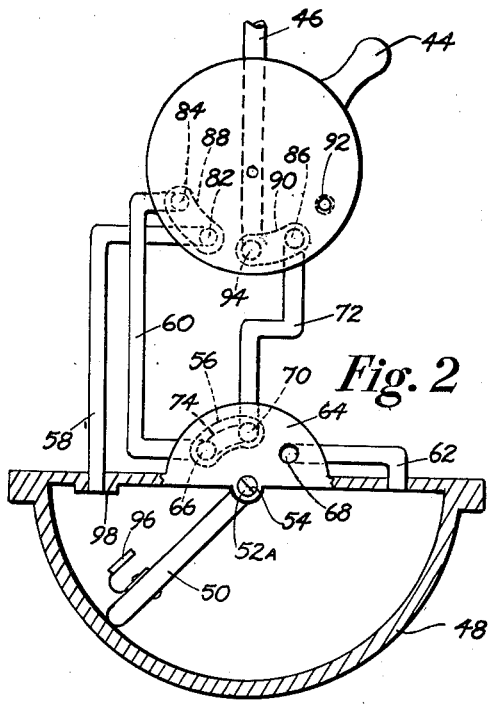
Fig. 2
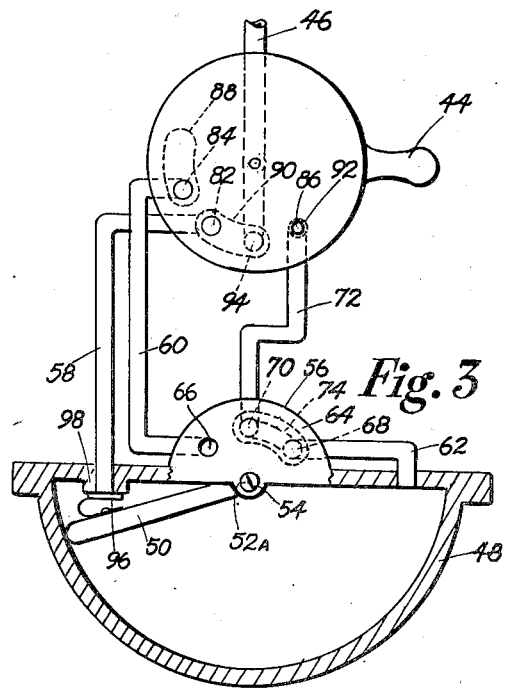
Fig. 3
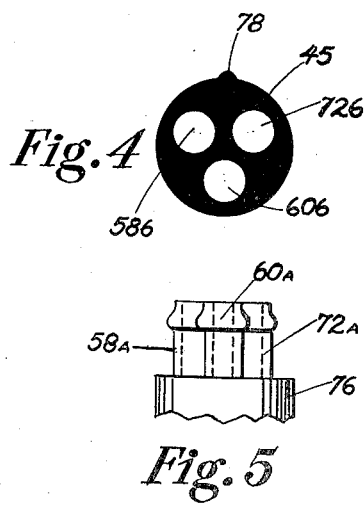
Fig. 4
Fig. 5
INVENTOR.
Raymond E. UTTER
BY Jan. 22, 1952

R. E. UTTER 2,583,348

REMOTE CONTROL PARKING WINDSHIELD WIPER MOTOR

Filed Nov. 13, 1944

INVENTOR
Raymond E. UTTER

BY Falvey, Souther & Stoltenberg

Patented Jan. 22, 1952

2,583,348

UNITED STATES PATENT OFFICE 2,583,348

REMOTE CONTROL PARKING WINDSHIELD WIPER MOTOR

Raymond E. Utter, Toledo, Ohio, assignor to The Electric Auto-Lite Company, Toledo, Ohio, a corporation of Ohio Application November 13, 1944, Serial No. 563,263

3 Claims. (Cl. 121—97)

This invention relates to windshield wiper motors, more particularly to motors operated by fluid pressure which are automatically parked when in inoperative condition under control of a segregated manual control at a point remote of the motor.

In the prior art, manifold vacuum operated motors were manually controlled from a remote point by the use of a manually controlled linkage which actuated a control valve mounted on the case of the motor, so that the valve position determined the operative and parking conditions of the motor and also throttling to control the speed of operation. This control system was not entirely reliable inasmuch as the linkage was made separable to facilitate mounting and often the linkage separated while in use so that an operator lost control over the motor. Furthermore, the linkage is generally subject to considerable lost motion which resulted in erratic control, particularly when throttling was attempted.

Other remote manual control means in the prior art comprised a remote manually operated control valve having an operating conduit and a parking conduit leading to the motor which were selectively connected by the manual control valve to a source of vacuum to operate, throttle, and park the motor. This construction makes necessary the use of a fluid-pressure operated valve means at the motor to obtain effective parking of the motor, which gave rise to a complicated and sensitive device which was subject to breakdown even with the most careful attention to manufacturing design. This was particularly true with reference to the fluid-pressure operated valve means on the motor.

The present invention contemplates the provision of a simple and effective remote manual control means which is insensitive and not subject to breakdown by the use of complicated mechanical linkages or sensitive fluid-pressure operated valve means. It further contemplates the provision of a control means in which both throttling and parking of the motor are reliably and simply obtained.

It is, therefore, a principal object of this invention to provide a remote manual control means for a fluid-pressure operated windshield wiper motor which is simple and reliable and suitable for mass production.

It is a further object of this invention to provide a remote manual control valve for a fluid-pressure operated motor which is in communication with the motor by a multiplicity of conduits all combined into one envelope.

It is a further object of this invention to provide a remote manual control means for a fluid-pressure operated windshield wiper motor which is in communication with the motor by a multiplicity of conduits all combined into one envelope which will allow an operator to control the operation and parking of the motor and also to throttle to control the speed of operation.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is an elevational view, partly in section, showing the application of the invention to an automobile.

Fig. 2 is an elevational view, partly in section, showing the motor and its control in operative relation.

Fig. 3 is an elevational view, partly in section, showing the motor and its control in parked relation.

Fig. 4 is a plan view, in section, of the connecting conduit.

Fig. 5 is an elevational view of a detail.

Figure 6:
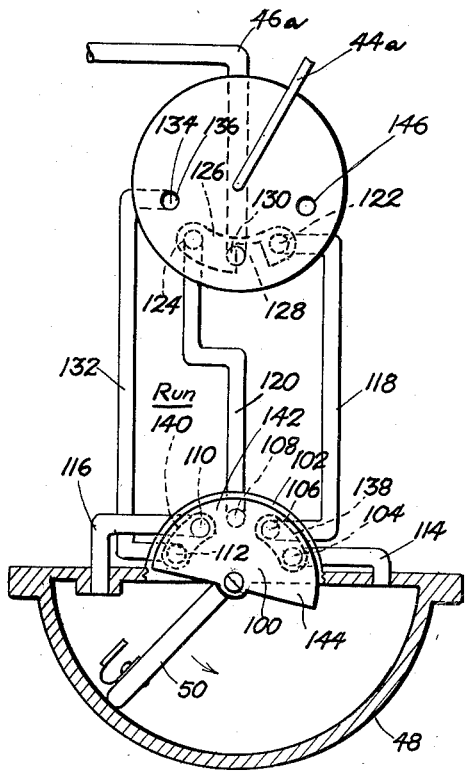
Fig. 6 is an elevational view, partly in section, showing a modification of the motor and its control in operative relation.

Referring now to the drawings, particularly to Fig. 1, an automobile body section 20 is shown having a windshield 22 with a lower edge 24, adjacent which a pivot 26 is mounted in the cowl member 28, having mounted thereon on its outer end a windshield wiper arm 30 for driving a blade 32 over the outer surface of the windshield in an arc as is well known in the art. The inner end of the pivot 26 is provided with an arm 34, or the like, which is connected to a driver arm 36 on the fluid-pressure operated motor 38 by a linkage 40. The motor 38 is mounted in any convenient manner (not shown) to the frame of the automobile and furnishes the power to move the blade 32 over the surface of the windshield and to park the same adjacent the lower edge 24. The motor is concealed under a dash 42 and is provided with a manual control 44 connected to the motor by a multi-passage conduit 45 as will be described in greater detail hereinafter. A conduit 46 is provided to communicate with the manual control 44 and the intake manifold of the automobile motor (not shown) to utilize the suction therein for driving the windshield wiper motor.

The motor 38 may have a casing 48 of semi-circular contour as shown in Figs. 2 and 3 having therein a movable vane or piston 50 oscillatable about a shaft 52 journaled in a bearing in the casing. These details of construction of the casing and piston are well known in the art and may be varied widely. The driver arm 36 is attached to one end of shaft 52 (Fig. 1) which projects a substantial distance from the casing. On the other end 52a of the shaft a non-circular portion 54 is provided which drives an automatic valve control mechanism (not shown) which may be similar to any of the control mechanisms well known in the art, usually involving an overcenter device which snaps over from one position to another through a lost motion connection with shaft 52 after the shaft has been oscillated by the piston 50 through a predetermined angle. This automatic control mechanism moves a flop valve 56 through an angle around the shaft 52 on which the valve is pivoted sufficiently to reverse the application of a fluid-pressure differential to the two sides of the piston 50 in the chambers formed thereby in the casing 48. Conduits 58, 60 and 62 lead from the respective chamber to a valve seat 64 which is pierced by ports 66 and 68 terminating the conduits 60 and 62 respectively. A third port 70 pierces at a central location the valve seat 64 between ports 66 and 68 and is placed in communication with a source of suction such as the intake manifold of an automotive engine (not shown) by means of conduits 72 and 46.

The ports 66, 68 and 70 are preferably uniformly spaced and concentrically arranged with reference to the shaft 52 so that a depression 74 formed in the valve member 56 will bridge ports 70 and 68, or ports 70 and 66, to control the vacuum applied to the chambers, when the valve member 56 is moved by the automatic valve control mechanism.

The three conduits 58, 60 and 72 preferably lead to a connection block 76 (Fig. 5) provided with suitable indexing means and preferably positioned at any convenient point on the body of motor casing 48, being in communication with nipples 58a, 60a and 72a, which fit into one end passage-ways 58b, 60b and 72b, of a flexible hose 45 (Fig. 4) all of said passage-ways being formed in the unitary body or envelope of the hose, preferably formed of rubber, or the like, having an indexing means 78. The other end of the passage-ways cooperate with a second connection block 80 provided with suitable indexing means which is positioned on the manual control valve 44 mounted to a place remote of the motor as, for example, the dash of the automobile as shown in Fig. 1. Passage-way 58b is in communication with port 82 of the manual control valve, passage-way 60b is in communication with port 84 and passage-way 72b is in communication with port 86, all ports being formed in the stationary portion of the control valve, which cooperates with a disk-like movable portion provided with two recesses 88 and 90 and a venting port 92. Conduit 46, in communication with the source of suction or fluid pressure, is also in communication with port 94.

In Fig. 2 the manual control valve 44 is shown in "Run" position with the source of suction in communication with conduit 46, which is placed in communication with conduit 72 by recess 90 bridging ports 86 and 94 so that suction will be communicated to the left side of the piston from port 70 to port 66 by the valve recess 74, then through conduit 60 to port 82, placed in communication with port 84 by recess 88, thence by conduit 58 to the chamber on the said left side of the piston in the casing 48. Port 68 is at this time open to the atmosphere so that the right chamber is vented by conduit 62 so that piston 50 moves clockwise. When the valve 56 is in the other position where its recess 74 bridges ports 70 and 68, the vacuum is applied to the chamber on the right side of the piston by conduit 62, while port 66 is open to the atmosphere to vent the chamber on the left side of the piston by conduits 60 and 58 so that the piston moves counterclockwise. In this manner the shaft 52 is given an oscillatory movement which operates the wiper blade 32 on the windshield 22.

When an operator wishes to terminate the normal operation of the motor and wiper, he moves the manual control valve 44 to the position shown in Fig. 3, which establishes communication between conduits 46 and 58 directly by bridging ports 94 and 82 by valve recess 90, which places suction on the chamber on the left side of the piston. Also venting port 92 is moved in alignment with port 86 which will vent the chamber on the right side of the piston to the atmosphere through conduits 72 and 62 which are in communication by flop valve recess 74 bridging ports 70 and 68. This will park the piston as shown with a valve disk 96 on the piston 50 closing the terminus 98 of the conduit 58. When normal operation is again desired, the operator will move the manual control valve back to its position in Fig. 2. For parking purposes, vacuum is maintained at all times on the left side of the piston.

Figure 8:
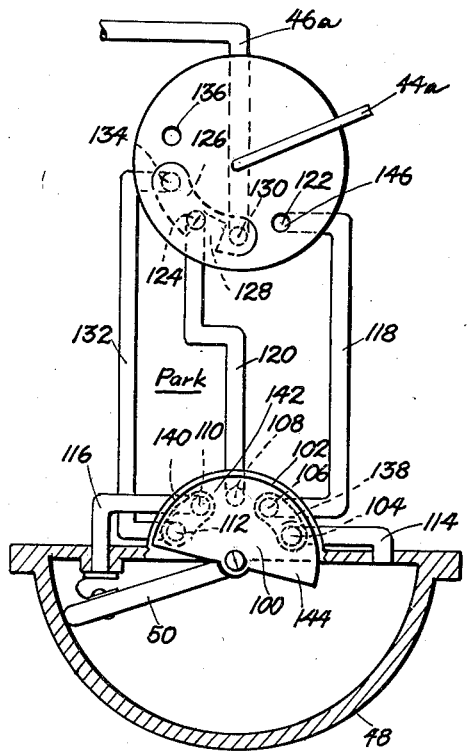
Fig. 8 is a view similar to Fig. 6 showing the motor in parked relation.
Figure 7:
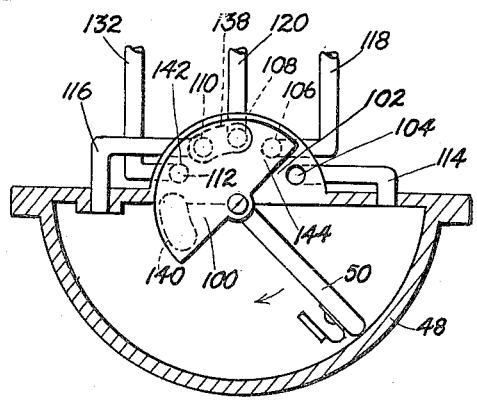
Fig. 7 is a view of the motor with its flop valve in the second operative position.

In Figs. 6, 7 and 8 a modification is shown wherein a novel flop valve 100 is disclosed cooperating with a valve seat 102 pierced by five ports 104, 106, 108, 110 and 112. The motor casing and piston construction is similar to that already disclosed, and a similar flop valve control mechanism is also provided which will move the flop valve 100 to its two positions substantially as shown in Figs. 6 and 7. Conduit 114 is provided to communicate with the chamber on the right side of the piston terminating in port 104 in the valve seat 102, while a second conduit 116 is provided to communicate with the chamber on the left side of the piston which terminates in port 110. The valve seat 102 is also provided with two suction supply ports 106 and 108 which communicate by conduits 118 and 120 with ports 122 and 124 in a fixed portion of a manual control valve 44a located at a point remote from the motor. A recess 126, having a throttling baffle 128, places ports 122 and 124 in communication with port 130 in communication with conduit 46a leading to a source of suction (not shown). The valve seat 102 is also provided with a venting port 112 which is in communication with conduit 132 terminating in port 134 in the fixed portion manual control valve 44a, in whose movable portion vent port 136 is provided to align with port 134 when the manual control valve is in "Run" position as shown in Fig. 6.

The flop valve 100 is provided with two recesses 138 and 140 in spaced relation separated by a web 142, and provided with a flange 144 on its right side (Fig. 6). In normal operation with the manual control valve 44a in "Run" position, the flop valve recess 138 in one position bridges ports 104 and 106 to place them in communication (Fig. 6) while in its second position (Fig. 7) it bridges ports 108 and 110, while recess 140 in the first position (Fig. 6) bridges ports 110 and 112 and in its second position is inoperative (Fig. 7). Web 142 in the first position (Fig. 6) closes port 108 and in the second position (Fig. 7) closes port 112. Flange 144 in the first position (Fig. 6) is inoperative and in its second position (Fig. 7) it closes port 106 while exposing port 104.

Referring to Fig. 6 in the first position of the flop valve 100 with the manual control valve 44a in "Run" position, the vacuum is applied to recess 126 by port 130 in communication with conduit 46a, then to ports 122 and 124 bridged by the recess 126 to ports 106 and 108 by conduits 118 and 120. Port 108 is closed by web 142 and is ineffective. Port 106 is placed in communication with port 104 on valve seat 102 by recess 138 in flop valve 100, which places the chamber on the right side of the piston in communication therewith by conduit 114 so that suction is effective on this chamber. The chamber on the left side of the piston is vented to the atmosphere through conduit 116 and recess 140 of flop valve 100 which bridges ports 110 and 112, the latter port being in communication with conduit 132, whose terminal port 134 is aligned with vent port 136 of the manual control valve. This will effect a counterclockwise movement of the piston until the flop valve 100 is moved to its second position shown in Fig. 7 by the automatic valve actuating mechanism.

The manual control valve 44a will still be in "Run" position so that the suction at port 108 in valve seat 102 will be communicated to port 110 by the recess 138 in flop valve 100, from here the suction will be communicated to the chamber on the left side of the piston by conduit 116. Port 104 will be opened to the atmosphere by the movement of the flop valve and will vent the chamber on the right side of the piston to the atmosphere through conduit 114. Port 106 will be closed by flange 144 and will be ineffective, as will also be port 112 which is closed by web 142. This will effect a clockwise movement of the piston until the automatic flop valve actuating mechanism moves the flop valve 100 again to the first position as shown in Fig. 6 to start a new cycle of oscillation which drives the wiper blade 32 (Fig. 1).

When the operator desires to park the wiper blade 32 adjacent the lower edge 24 of the windshield 22, he moves the manual control valve to a position shown in Fig. 8. The recess 126 bridges ports 130 (vacuum source) 124 and 134, while venting port 136 will be moved out of alignment with port 134, and a second venting port 146 will be moved into alignment with port 122 as shown. The vacuum will then be applied to ports 124 and 134, and proceeds through conduits 120 and 132 to ports 108 and 112 on the valve seat 102. With the flop valve 100 in its final position during parking as shown in Fig. 8, port 108 is made ineffective by stopping by web 142 while port 112 will be in communication with port 110 by recess 140 in the flop valve so that suction will be applied to the chamber on the left side of the piston by conduit 116. The chamber on the right side of the piston will be vented to the atmosphere through conduit 114 to port 104, which is in communication with port 106 by recess 138 in the flop valve 100, then through conduit 118 to terminal port 122 which is in alignment with venting port 146.

Should the operator change the position of the manual control valve 44a when the flop valve is in the second position shown in Fig. 7, the vacuum to bring about the parking operation will proceed from port 108 through recess 138 to port 110 and thence to the chamber on the left side of the piston through conduit 116. The chamber on the right side of the piston will be vented to the atmosphere through conduit 114 whose terminal port 104 is exposed by flange 144. This will institute the parking movement until the flop valve moves to the position shown in Fig. 8 by the automatic flop valve actuating mechanism.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed:

1. In a device of the class described, a motor having a casing including a portion movable therein when subject to a fluid-pressure differential, automatic valve means controllable by the movable portion to reverse the pressure differential at predetermined times with reference to the movable portion, a valve seat on the casing having five ports, including two suction supply ports, two chamber ports and a vent port, said valve means having a pair of cooperating passages to control the flow of the fluid-pressure differential to said motor through said ports, and a manually movable control valve cooperating with said ports to determine the operative and parking periods of the motor.

2. In a device of the class described, a motor having a casing including a portion movable therein when subject to a fluid-pressure differential, automatic valve means controllable by the movable portion to reverse the pressure differential at predetermined times with reference to the movable portion, a valve seat on the casing having five ports, including two suction supply ports, two chamber ports and a vent port, said valve means having a pair of spaced passage-ways to control the flow of the fluid-pressure differentials through said ports, also having a spacing web between said passage-ways and an outwardly extending flange, and a manually movable control valve cooperating with said ports to determine the operative and parking periods of the motor.

3. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor, said valve mechanism including reversing valve means having means defining passage means for connecting said supply passage to said motor and being automatically operable at said limits to reverse said connection, and control valve means operable, at any time regardless of the position of said reversing valve means to establish a connection, through said reversing valve passage means, of said supply passage to said motor which causes a said relative movement toward one of said limits.

RAYMOND E. UTTER.

REFERENCES CITED

The following references are of record in the file of this patent:

UNITED STATES PATENTS

| Number | Name | Date |
|---|---|---|
| 1,674,056 | Oishei et al. | June 19, 1928 |
| 1,840,233 | Hueber | Jan 5, 1932 |
| 1,891,670 | Ernst | Dec. 20, 1932 |
| 1,953,701 | Clark et al. | Apr. 3, 1934 |
| 2,257,066 | O'Shei | Sept. 23, 1941 |